US012692886B2

(12) United States Patent
Tseng et al.

(10) Patent No.: US 12,692,886 B2
(45) Date of Patent: Jul. 28, 2026

(54) FIXING DEVICE

(71) Applicant: HANWIT PRECISION INDUSTRIES LTD., New Taipei City (TW)

(72) Inventors: Ying-Chih Tseng, New Taipei City (TW); Ming-De Wu, New Taipei City (TW)

(73) Assignee: HANWIT PRECISION INDUSTRIES LTD., New Taipei City (TW)

( * ) Notice: Subject to any disclaimer, the term of this patent is extended or adjusted under 35 U.S.C. 154(b) by 182 days.

(21) Appl. No.: 18/658,083

(22) Filed: May 8, 2024

(65) Prior Publication Data

US 2025/0347303 A1 Nov. 13, 2025

(51) Int. Cl.
F16B 5/06 (2006.01)

(52) U.S. Cl.
CPC .................................. F16B 5/0642 (2013.01)

(58) Field of Classification Search
CPC ... E05C 1/08; E05C 1/085; E05C 1/02; E05C 1/12; E05C 1/14; E05C 1/163; E05C 1/002; E05C 1/06; E05B 65/0864; F16B 21/065; F16B 21/125; F16B 13/10; F16B 5/0642; Y10T 403/60; Y10T 403/602; Y10T 403/598
USPC ..... 403/323, 322.1, 324, 327; 292/164, 165, 292/58, 61
See application file for complete search history.

(56) References Cited

U.S. PATENT DOCUMENTS

| | | | | |
|---|---|---|---|---|
| 701,238 | A * | 5/1902 | Williams | ............ E05B 65/0864 292/61 |
| 901,470 | A * | 10/1908 | Rankins | .............. E05B 65/0864 292/61 |
| 1,020,437 | A * | 3/1912 | Nelson | .................. B65F 1/1615 292/61 |
| 1,427,253 | A * | 8/1922 | Appleby | ................... E05C 1/06 292/37 |
| 4,113,221 | A * | 9/1978 | Wehner | .................. A47C 7/004 403/324 |
| 4,165,854 | A * | 8/1979 | Duly | ........................ A47C 3/34 403/324 |
| 7,980,519 | B2 * | 7/2011 | Chen | ........................ A47B 9/14 248/161 |
| 8,157,117 | B2 * | 4/2012 | Grampassi | ............... B67D 3/00 220/326 |
| 8,939,691 | B2 * | 1/2015 | Tseng | ...................... F16B 21/04 411/347 |

(Continued)

*Primary Examiner* — Jack W Lavinder
(74) *Attorney, Agent, or Firm* — MUNCY, GEISSLER, OLDS & LOWE, P.C.

(57) ABSTRACT

A fixing device includes a base with a limiting groove and a guide path, a sleeve inserted into the through hole of the base and having a flange clamped in the limiting groove, a limiting ring portion passed to the outside, an accommodation space, a through hole at the limiting ring portion, a sliding path on the limiting ring portion and a clamping groove recessed on one the sliding path, a shaft with a clamping rod and a connecting portion, and a wrench placed outside the sleeve and against the guide path and having stop ribs for sliding in and out of the clamping groove along the sliding path, a locating block for assembly of the connecting portion of the shaft, a driving path against the guide path and pushing surfaces aligned with the stop ribs to easily identify the purpose of the rotational displacement of the wrench.

7 Claims, 10 Drawing Sheets

(56) References Cited

U.S. PATENT DOCUMENTS

| | | | | |
|---|---|---|---|---|
| 9,091,293 | B1 * | 7/2015 | Tseng ..................... | F16B 21/12 |
| 9,441,653 | B2 * | 9/2016 | Wang ................... | F16B 17/006 |
| 10,487,866 | B2 * | 11/2019 | Wu ....................... | F16B 19/109 |
| 11,098,839 | B2 * | 8/2021 | Wang ................... | F16B 37/042 |
| 11,371,540 | B2 * | 6/2022 | Schlack .................. | F16B 9/054 |
| 2004/0083586 | A1 * | 5/2004 | Bentrim ............... | F16B 19/109 |
| | | | | 24/458 |
| 2011/0070049 | A1 * | 3/2011 | Wang ................... | F16B 5/0208 |
| | | | | 411/372.6 |
| 2013/0071177 | A1 * | 3/2013 | Wang ................... | F16B 19/109 |
| | | | | 403/167 |
| 2015/0010346 | A1 * | 1/2015 | Wang ................... | F16B 17/006 |
| | | | | 403/322.4 |
| 2015/0084347 | A1 * | 3/2015 | Olsson ..................... | E05C 1/08 |
| | | | | 292/137 |
| 2018/0202481 | A1 * | 7/2018 | Wu ........................ | F16B 21/02 |

* cited by examiner

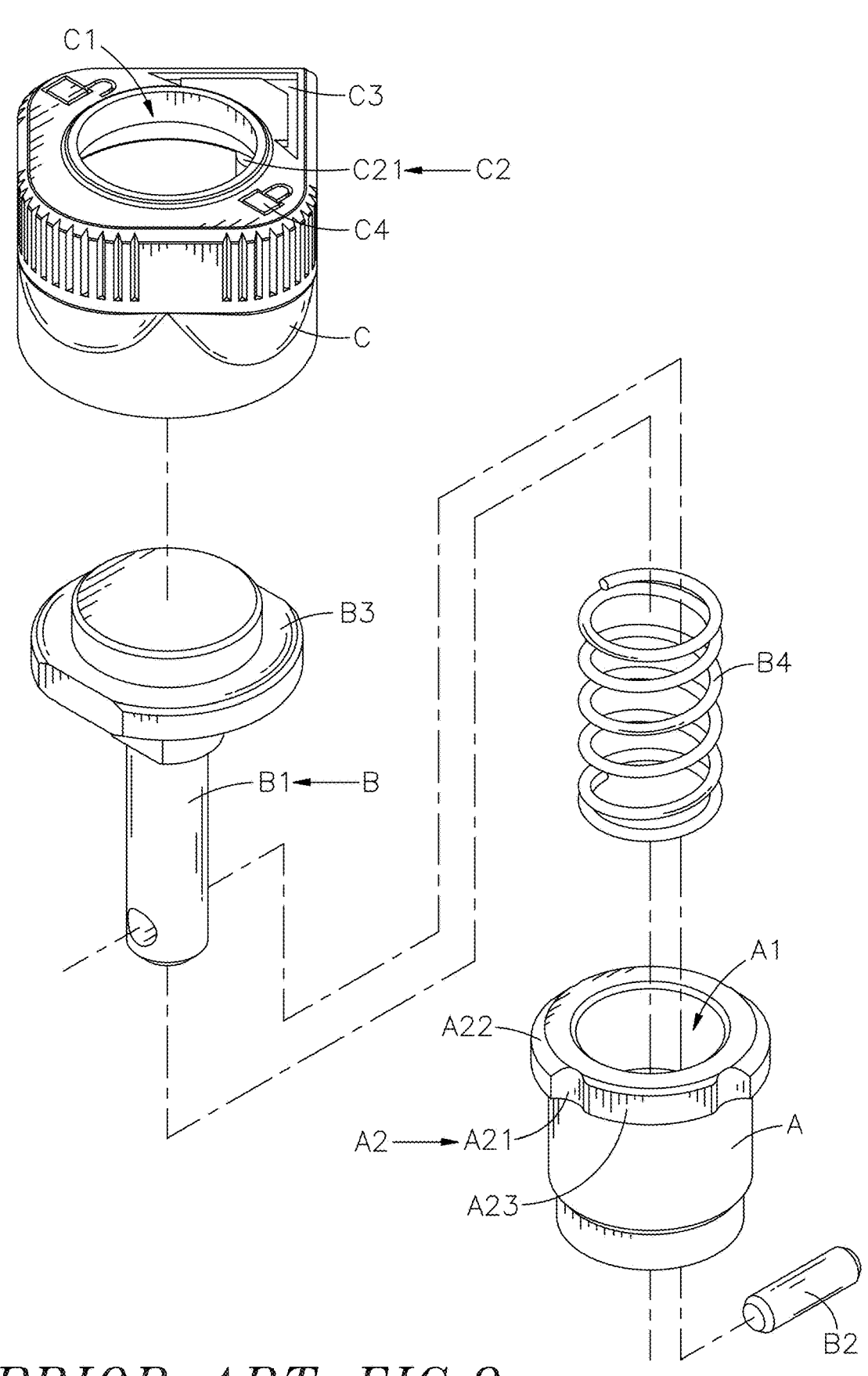
*PRIOR ART FIG.9*

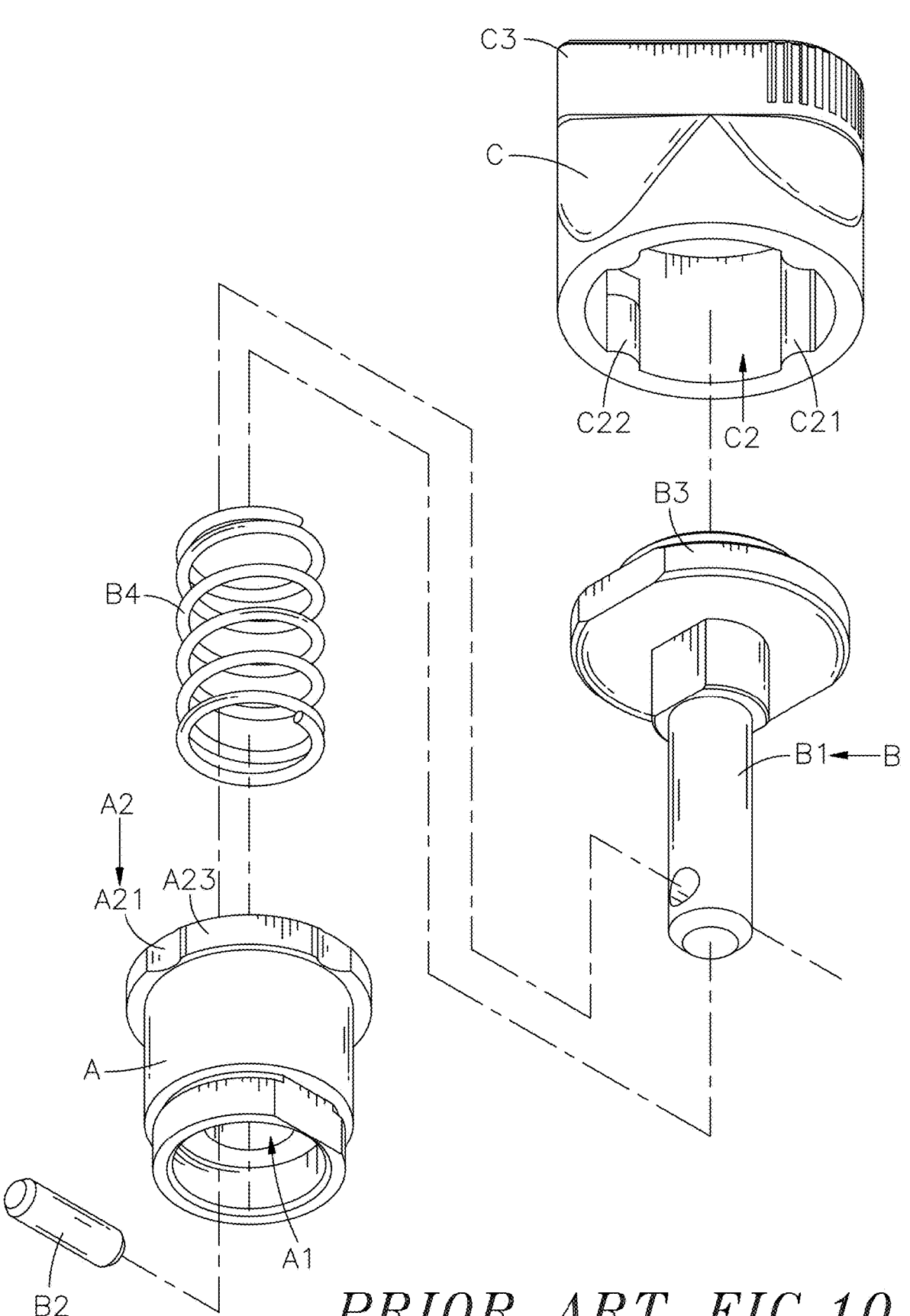
*PRIOR ART FIG.10*

FIXING DEVICE

BACKGROUND OF THE INVENTION

1. Field of the Invention

The present invention provides a fixing device, especially a fixing device that can be surely turned without being offside. It assembles a sleeve and a shaft inside the base, and sets a wrench outside. By displacing the internal stop ribs of the wrench along the sliding path of the sleeve to enter and exit the clamping groove, the purpose of ensuring the rotation of the wrench is achieved.

2. Description of the Related Art

When general panels (board-to-board) are assembled, they are locked by using positioning screws equipped with knobs, collars and screws, and the screws and collars can be fixed to the first panel, and apply force to turn the knob so that the screws can be locked into the second panel to form a predetermined position, then using a hand tool to lock the screws, so that the first panel and the second panel are locked and fixed into one. This locking method can be used in telecommunications office cabinets, industrial computer cases, workstation panels, etc., by using a plurality of knobs, screws and other devices and mechanisms for board-to-board connection.

However, if the users or field workers do not carry appropriate hand tools when working, the overall disassembly and assembly works will be affected. Therefore, some manufacturers have developed another positioning device that can be used by field workers or users to rotate with bare hands to fix or disassemble board-to-board assembly. Please refer to FIGS. 9 and 10. It can be clearly seen from the figures that the conventional positioning device is provided with a penetrable through hole A1 inside the sleeve A, and a limiting ring A2 is protruding from the outer edge of the top of the sleeve A. The surface of the limiting ring A2 is provided with a plurality of grooves A21 arranged at intervals. The limiting ring A2 forms two first ring edges A22 with an enlarged outer diameter between any two adjacent grooves A21, and two second ring edges A23 with reduced outer diameter staggered with the two first ring edges A22. Then a shank B1 of a rotary locking member B is penetrated in the through hole A1. The bottom of shank B1 is equipped with a rotary rod B2. There is also a shank head B3 on the top of shank B1 that exposes the outside of sleeve A. The shank B1 is sleeved with an elastic member B4 that resists the inside of the through hole A1, and the rotary locking member B is assembled with an outer sleeve C on the outside. There is an installation space C1 inside the outer sleeve C for assembly of the shank head B3, and one side of the installation space C1 is provided with a sliding hole C2 that covers the outside of the limiting ring A2 and moves longitudinally. There are two opposite long protrusions C21 and two opposite short protrusions C22 adjacent to the two long protrusions C21 on the inner wall of the sliding hole C2. Each long protrusion C21 and short protrusion C22 are respectively aligned and locked in each groove A21 on the outer edge of the limiting ring A2. The outer top of the outer sleeve C is provided with an angular twisting portion C3 facing outward. There is also an indicator C4 with opening and closing marks on the top surface of outer sleeve C. When the sleeve A is positioned on the preset positioning plate member (not shown in the figures), the outer sleeve C can be used to drive the shank B1 of the rotary locking member B to perform longitudinal lifting and lowering displacement along the through hole A1 of the sleeve A to make the rotary rod B2 of the rotary locking member B pass through the hole in the preset fixed plate member (not shown in the figures). Then rotate the outer sleeve C by turning the twisting portion C3 of the outer sleeve C in 90 degrees clockwise or counterclockwise, thereby driving the rotary rod B2 to rotate and hold on the bottom surface of the preset fixed plate member. Then, the preset positioning plate member and the preset fixed plate member can be locked together with bare hands.

However, since the two first ring edges A22 and the two second ring edges A23 of the limiting ring A2 of the sleeve A are arranged in a staggered manner, and the two long protrusions C21 and the two short protrusions C22 of the inner wall of the sliding hole C2 of the outer sleeve C are arranged oppositely, when the outer sleeve C is pressed down and rotated, the two long protrusions C21 of the outer sleeve C can only rotate in the direction of the two second ring edges A23 with the smaller outer diameter at the same time. Therefore, whether the outer sleeve C is in the locked or unlocked state, it can only be used by reciprocating rotation in one direction (clockwise or counterclockwise). As a result, when the rotation rod B2 of the rotary locking member B is locked on the preset fixed plate member, subsequent users cannot know whether the rotary locking member B is locked or unlocked by the rotating methods (because locking or unlocking both rotate 90 degrees). This will affect the time and smoothness of the overall disassembly and assembly works. Not only it is quite time-consuming and inconvenient, but also the indicator C4 must be further processed on the top surface of the outer sleeve C to know the locking and unlocking direction of the positioning device, thereby increasing the cost of the processing operation. Whether the outer sleeve C is in the locked or unlocked state, it is used by reciprocating rotation. When the two long protrusions C21 and the two short protrusions C22 of the outer sleeve C are rotated at the limiting ring A2, it is easy to operate the outer sleeve C with too much force or too fast, causing the two long protrusions C21 and the two short protrusions C22 to cross the groove A21 to be locked and rotate to the groove A21 of the next position, so that it leads improper conditions of inaccurate locking and it can also easily lead to friction losses between the two long protrusions C21 and the two short protrusions C22, the plurality of grooves A21, the two first ring edges A22 and the two second ring edges A23.

In addition, general positioning devices are mostly installed in the chassis panels of telecommunications office cabinets, industrial computer chassis, workstation panels, server chassis and other equipment. Since the light inside the chassis is dim, the indicator C4 of the outer sleeve C of the positioning device is difficult to see and identify, so that the user can only feel whether it is locked or unlocked by feeling during operation. And because the operating sensitivity of locking or unlocking is the same, it causes a lot of inconvenience during use.

Therefore, how to solve the problem that when the current positioning device is used, the indicator on the top surface of the outer sleeve must be used to understand the locking and unlocking direction of the positioning device, and when applying force to rotate the outer sleeve, it is easy to cause troubles and defects such as rotating beyond the positioned position due to excessive force, that is the direction that relevant manufacturers in this industry are eager to study and improve.

SUMMARY OF THE INVENTION

Therefore, in view of the above-mentioned problems and deficiencies, the inventor collected relevant information, and after multiple evaluations and considerations, he designed the invention of this fixing device.

The main object of the present invention is to provide a fixing device that is provided with a limiting groove and a guide path on both sides of the through hole of the base, so that the sleeve body of the sleeve can be inserted into the through hole, and the flange on one side of the sleeve is clamped in the limiting groove and the limiting ring portion on the other side is passed through the outside of the base. There is a through hole in the limiting ring portion and a clamping groove recessed on one side of the sliding path on the outer ring surface. The shaft mounted with the elastic member is installed in the accommodation space of the sleeve. The clamping rod on one side of the shaft goes in and out of the accommodation space, and the connecting portion on the other side goes out of the sleeve. The wrench is then placed on the outside of the sleeve, and the driving path on one side of the wrench is used to resist the guide path of the base. The stop ribs in the receiving space of the wrench can slide in and out the clamping groove along the sliding path of the limiting ring portion. A locating block is provided on one side of the receiving space of the wrench for assembly of the connecting portion of the shaft, and a driving path is provided on the other side to resist the guide path, and two pushing surfaces are respectively provided on the driving path corresponding to the outer side of the stop ribs to achieve the purpose of easily identifying the rotational displacement of the wrench. It can also ensure that when the wrench is rotating, the internal stop ribs can be blocked by the clamping groove and difficult to cross. It has the effect of reliable rotation and can also reduce excessive friction and loss between the stop ribs and the sliding path and clamping groove.

Another object of the present invention is that the continuous undulating guide path on the edge of one side of the base is U-shaped, comprising a supporting surface located at each of two relatively high points and a positioning portion located at each of two relatively low points; the continuous undulating driving path on the edge of one side of the wrench is also U-shaped, comprising two opposing pushing surfaces and two receiving portions respectively rotated and displaced along the two positioning portions and the two supporting surfaces. The base further comprises a straight blocking edge provided on one side of the limiting groove on one side of the through hole. The sleeve further comprises a resisting cutting edge located on one side of the flange and aligned and abutted against the blocking edge. This prevents the sleeve from rotating axially inside the through hole of the base.

Still another object of the present invention is that the sleeve further comprises the flange with an enlarged outer diameter on one side of the sleeve body, and the limiting ring portion with an outer diameter smaller than the outer diameter of the flange on an opposite side of the sleeve body; the J-shaped high and low clamping groove recessed on the outside of the limiting ring portion; the outer diameter of the limiting ring portion at the low part of the clamping groove extends in a gradual increasing ring shape to the outer edge of the high part on an opposite side of the clamping groove to form the sliding path, so that the stop ribs of the wrench are capable of sliding into the clamping groove along the low part of the sliding path outside the limiting ring portion, and then being blocked and limited by the high part on the opposite side of the clamping groove. It can prevent the stop ribs of the wrench from crossing the clamping groove, which provides the function for the wrench to be firmly locked in place.

Still another object of the present invention is that the shaft further comprises the clamping rod with an enlarged rod diameter on one side thereof, a shoulder formed between the shaft and the clamping rod; the elastic member has one side thereof resisting the shoulder and an opposite side thereof resisting the top of the accommodation space inside the limiting ring portion on one side of the sleeve; the connecting portion on the other side of the shaft is assembled to the locating block of the receiving space on one side of the wrench selectively by means of tight fit, interference fit, adhesive bonding or welding; the locating block is provided with a fixing hole for alignment and assembly of the connecting portion.

Still another object of the present invention is that the stop ribs of the wrench are arc-shaped protruding inside the receiving space and respectively corresponding to one of the top surfaces of the driving path; the wrench further comprises a trapezoid-shaped twisting portion protruding from the outside thereof relative to the stop ribs and the pushing surfaces, and a mounting hole on one side of the receiving space for assembly and positioning of the locating block.

BRIEF DESCRIPTION OF THE DRAWINGS

FIG. 9 is a three-dimensional exploded view of a conventional positioning device.

FIG. 10 is a three-dimensional exploded view of the conventional positioning device from another perspective.

DETAILED DESCRIPTION OF THE PREFERRED EMBODIMENT

Figure 1:
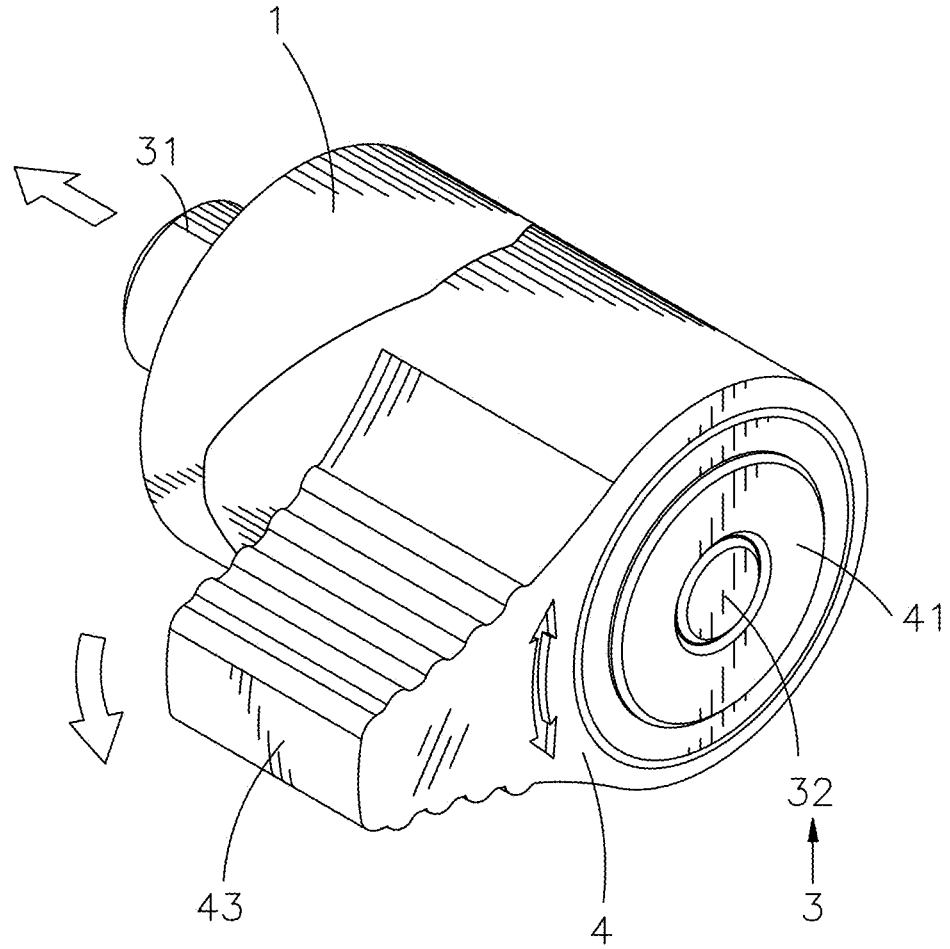
FIG. 1 is a three-dimensional appearance view of the present invention.
Figure 2:
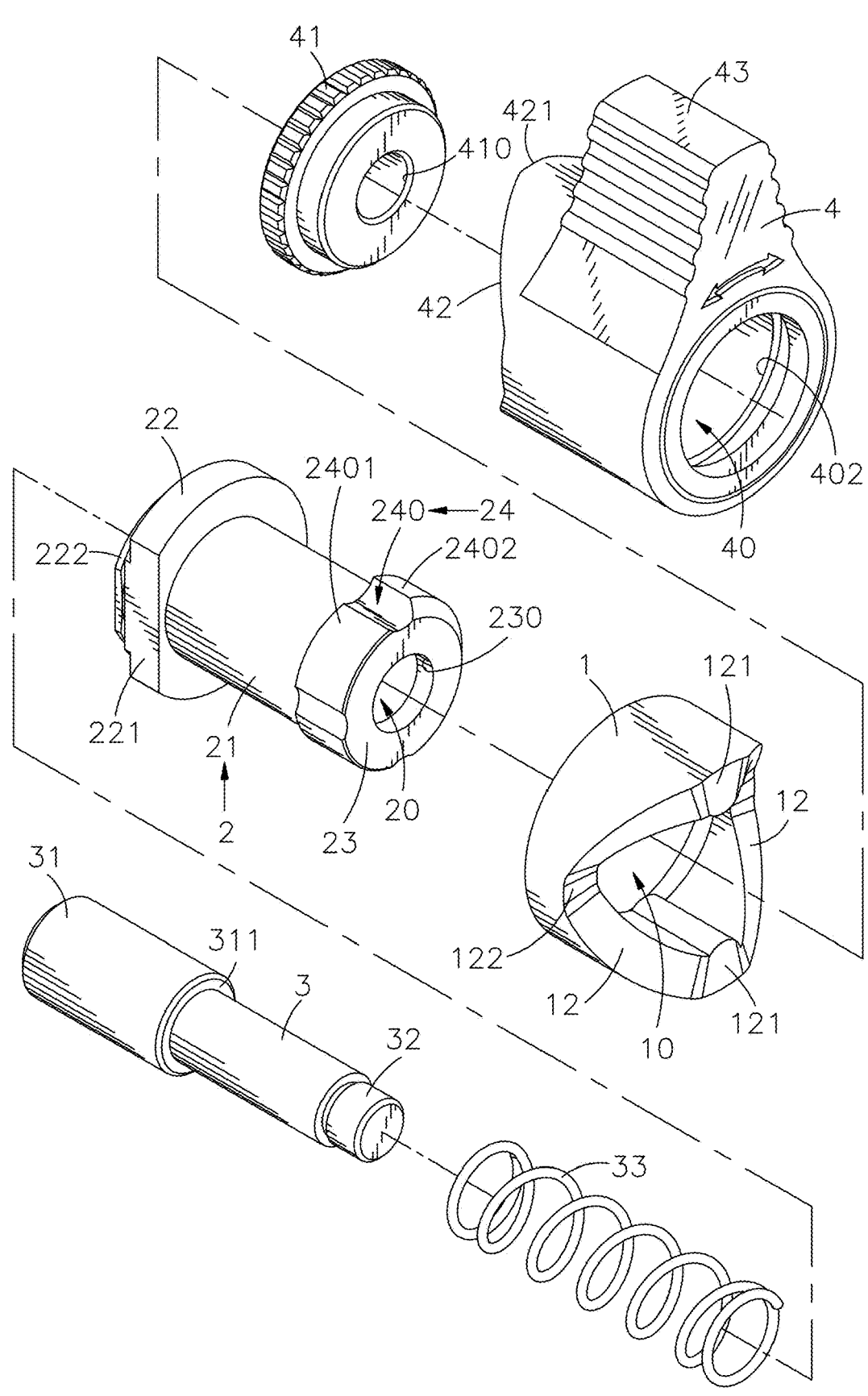
FIG. 2 is a three-dimensional exploded view of the present invention.
Figure 3:
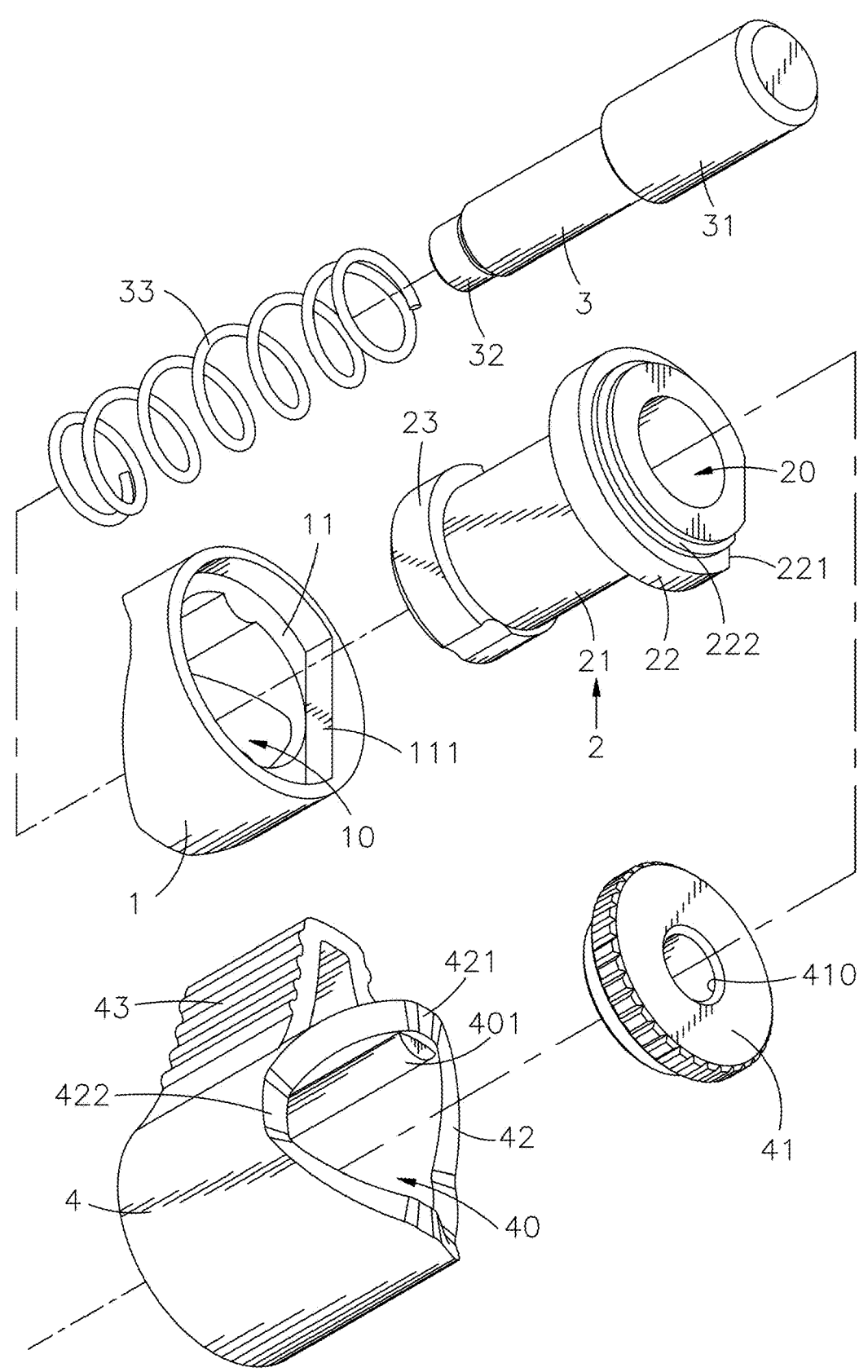
FIG. 3 is a three-dimensional exploded view of the present invention from another perspective.
Figure 4:
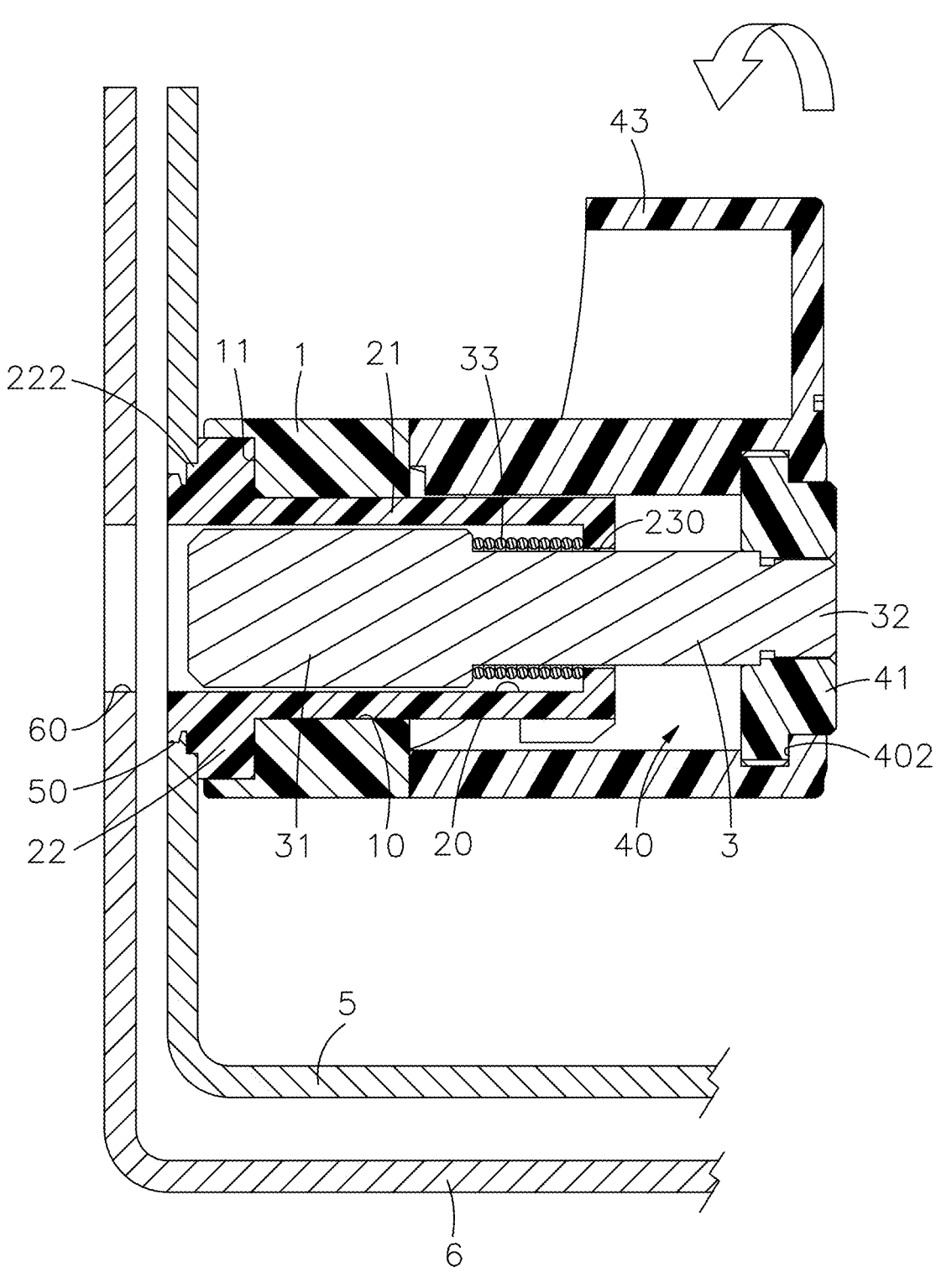
FIG. 4 is a side cross-sectional view of the present invention.

In order to achieve the above objects and effects, the technical means and structures adopted by the present invention are described in detail below by way of a preferred embodiment accompanying with the annexed drawings so as to facilitate a complete understanding.

Please refer to FIGS. 1-4. It can be clearly seen from the figures that the fixing device of the present invention comprises a base 1, a sleeve 2, a shaft 3 and a wrench 4.

The base 1 comprises a penetrable through hole 10 inside, a limiting groove 11 with an enlarged aperture provided on one side of the through hole 10, and a continuous undulating guide path 12 provided on the edge of the other side of the base 1 relative to the limiting groove 11.

The sleeve 2 comprises a sleeve body 21 movably through the through hole 10 of the base 1, a flange 22 located on one side of the sleeve body 21 and clamped in the limiting groove 11, a limiting ring portion 23 located on the other side of the sleeve body 21 relative to the flange 22 and passed through the outside of the base 1, a penetrable accommodation space 20 provided inside the sleeve 2, a through hole 230 with a reduced aperture located at the limiting ring portion 23 on one side of the accommodation space 20, a sliding path 24 with a tapering outer diameter provided on the outer ring surface of the limiting ring portion 23, a clamping groove 240 recessed on one side of the sliding path 24, and a docking portion 222 provided on the other side of the flange 22 relative to the sleeve body 21.

The shaft 3 is movably disposed in the accommodation space 20 of the sleeve 2. A clamping rod 31 provided on one side of the shaft 3 retractably move in and out at the accommodation space 20, and a connecting portion 32 provided on the other side thereof goes out of the accommodation space 20 and the through hole 230. In addition, an elastic member 33 is mounted around the shaft 3 with one side thereof resisting the clamping rod 31.

The wrench 4 is provided with a receiving space 40 inside, which can be mounted outside the sleeve 2 and resisted the guide path 12 of the base 1. The inner wall of the receiving space 40 is provided with two opposing stop ribs 401 that can be rotated and slid along the sliding path 24 outside the limiting ring portion 23 of the sleeve 2 to allow entry and exit of the clamping groove 240. A locating block 41 is provided on one side of the receiving space 40 for assembly and positioning of the connecting portion 32 on one side of the shaft 3. A driving path 42 is provided on the outer edge of the other side of the receiving space 40 to movably resist the guide path 12, and two pushing surfaces 421 are respectively provided on the driving path 42 corresponding to the outer side of the stop ribs 401.

The above-mentioned base 1 of the present invention is provided with the U-shaped continuous undulating guide path 12 on the edge of one side thereof. The guide path 12 includes a supporting surface 121 located at each of two relatively high points and a positioning portion 122 located at each of two relatively low points. The edge of one side of the wrench 4 is provided with the U-shaped and continuously undulating driving path 42. The driving path 42 is provided with two opposing pushing surfaces 421 and two receiving portions 422, and the two opposing pushing surfaces 421 and the two receiving portions 422 are respectively aligned and fitted to the two positioning portions 122 and the two supporting surfaces 121, so that the two pushing surfaces 421 and the two receiving portions 422 of the driving path 42 are capable of rotational displacement along the two positioning portions 122 of the guide path 12 respectively. A straight blocking edge 111 is provided on one side of the limiting groove 11 on one side of the through hole 10 inside the base 1. The flange 22 on one side of the sleeve 2 is provided with a resisting cutting edge 221, which can be aligned and abutted against the blocking edge 111, thereby preventing the sleeve 2 inside the through hole 10 of the base 1 from the axial rotation.

In addition, the above-mentioned sleeve 2 of the present invention is provided with the flange 22 with an enlarged outer diameter on one side of the sleeve body 21, and the limiting ring portion 23 with an outer diameter smaller than the outer diameter of the flange 22 on the other side of the sleeve body 21. The outer diameter of the flange 22 is larger than the outer diameter of the limiting ring portion 23, and the outer diameter of the limiting ring portion 23 is larger than the outer diameter of the sleeve body 21. The J-shaped high and low clamping groove 240 is recessed on the outside of the limiting ring portion 23. The outer diameter of the limiting ring portion 23 at the low part 2401 of the clamping groove 240 extends in a gradual increasing ring shape to the outer edge of the high part 2402 on the other side of the clamping groove 240 to form the sliding path 24, so that the stop rib 401 of the wrench 4 can slide along the low part 2401 of the sliding path 24 outside the limiting ring portion 23 into the clamping groove 240, and then be blocked and limited by the high part 2402 on the other side of the clamping groove 240 to prevent the stop rib 401 of the wrench 4 from crossing the clamping groove 240, thereby providing the function of ensuring the clamping positioning of the wrench 4.

In addition, the above-mentioned shaft 3 of the present invention is provided with the clamping rod 31 that enlarges the rod diameter on one side thereof, and a shoulder 311 is formed between the shaft 3 and the clamping rod 31 for one side of the elastic member 33 to resist the shoulder 311. The other side of elastic member 33 resists the top of the accommodation space 20 inside the limiting ring portion 23 on one side of the sleeve 2. The connecting portion 32 on the other side of the shaft 3 is assembled to the locating block 41 on one side of the receiving space 40 of the wrench 4 by means of tight fit, interference fit, adhesive bonding or welding. The locating block 41 may be provided with a fixing hole 410 for alignment and assembly of the connecting portion 32.

Furthermore, the above-mentioned wrench 4 of the present invention is provided with the arc-shaped stop rib 401 protruding inside the receiving space 40. The stop rib 401 corresponds to one of the pushing surfaces 421 on one side of the driving path 42. A trapezoid-shaped twisting portion 43 is protruding from the outside of the wrench 4 relative to the stop ribs 401 and the pushing surfaces 421, and the wrench 4 is provided with a mounting hole 402 on one side of the receiving space 40 for assembly and positioning of the locating block 41.

Figure 5:
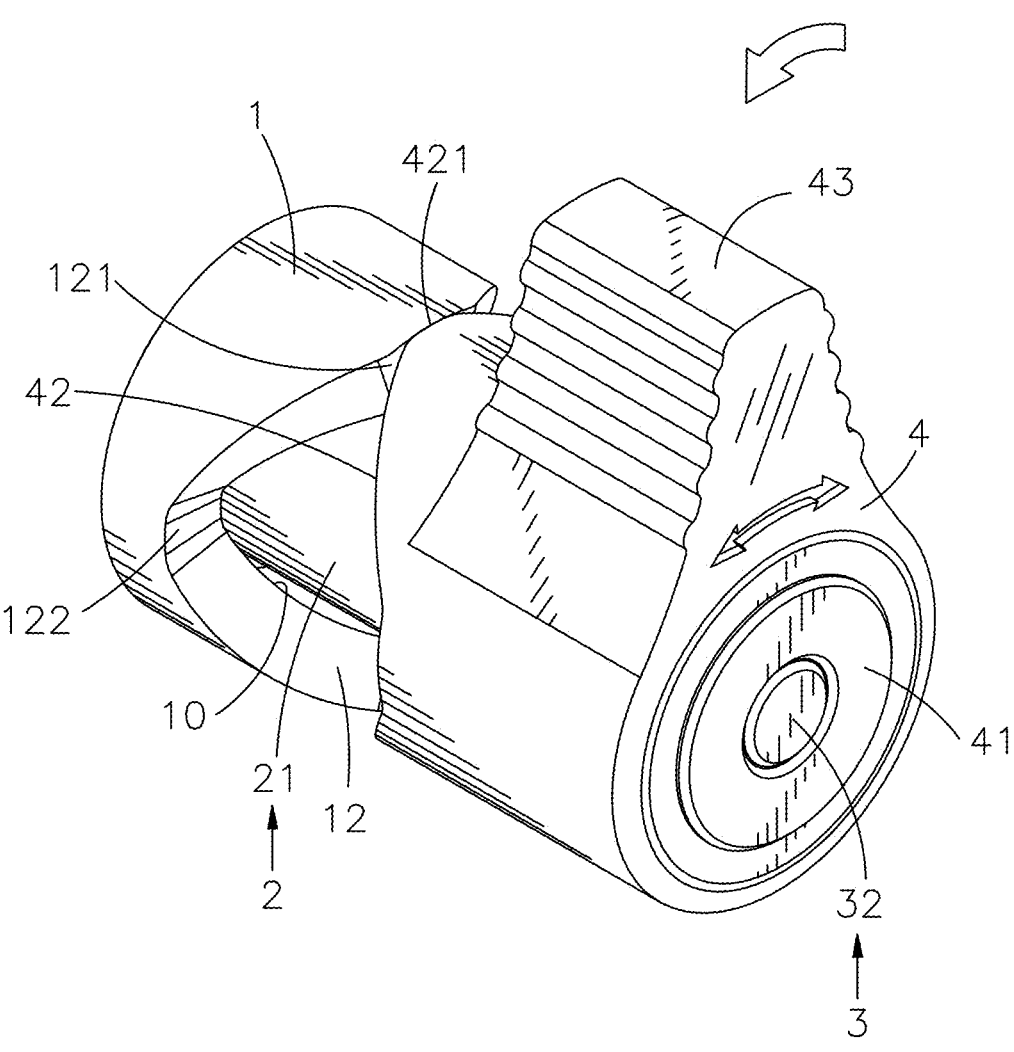
FIG. 5 is a three-dimensional appearance view of the operating embodiment of the present invention.
Figure 6:
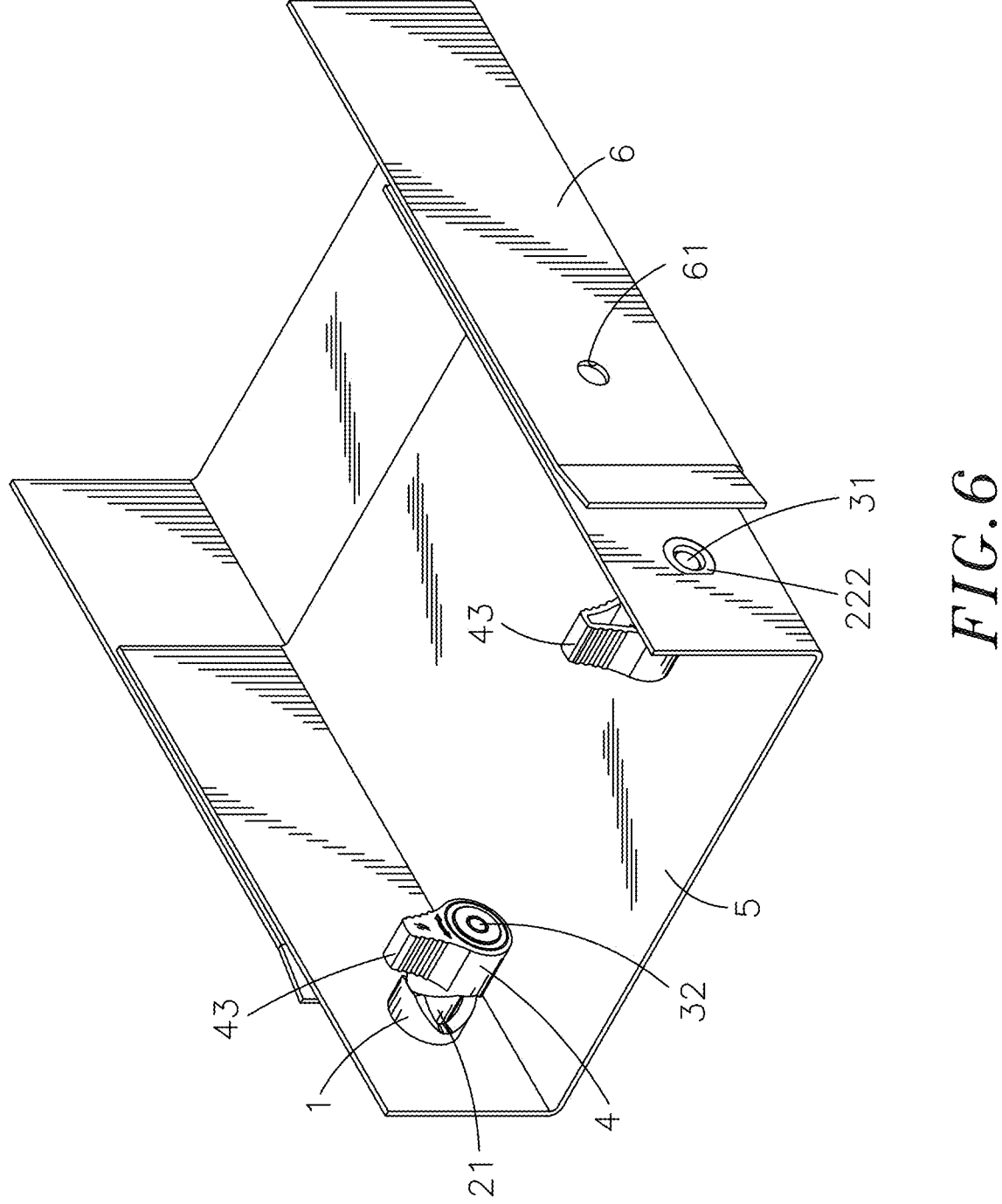
FIG. 6 is a disassembled three-dimensional appearance view of the preferred embodiment of the present invention.
Figure 7:
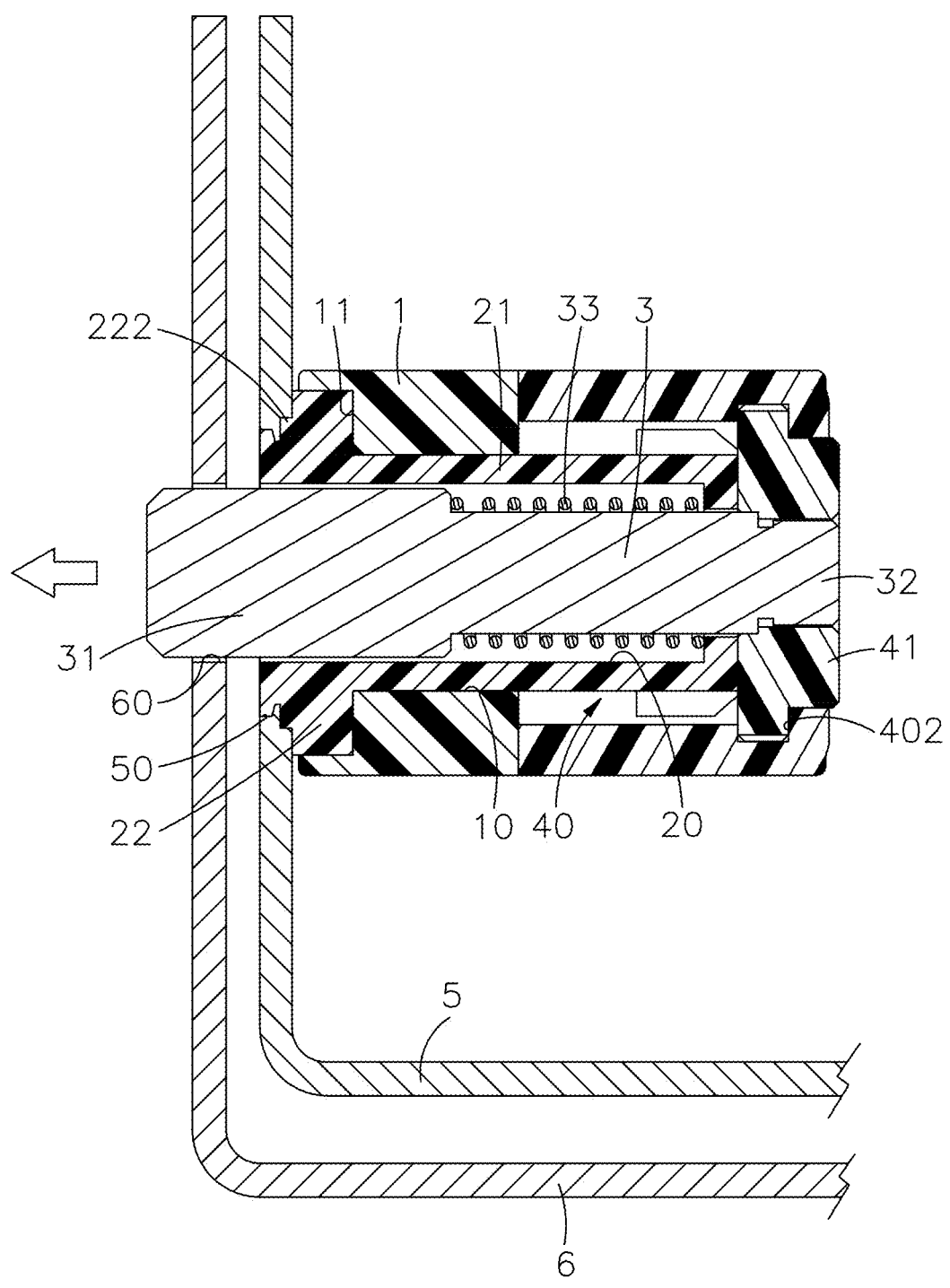
FIG. 7 is a side cross-sectional view of an operating embodiment of the present invention.
Figure 8:
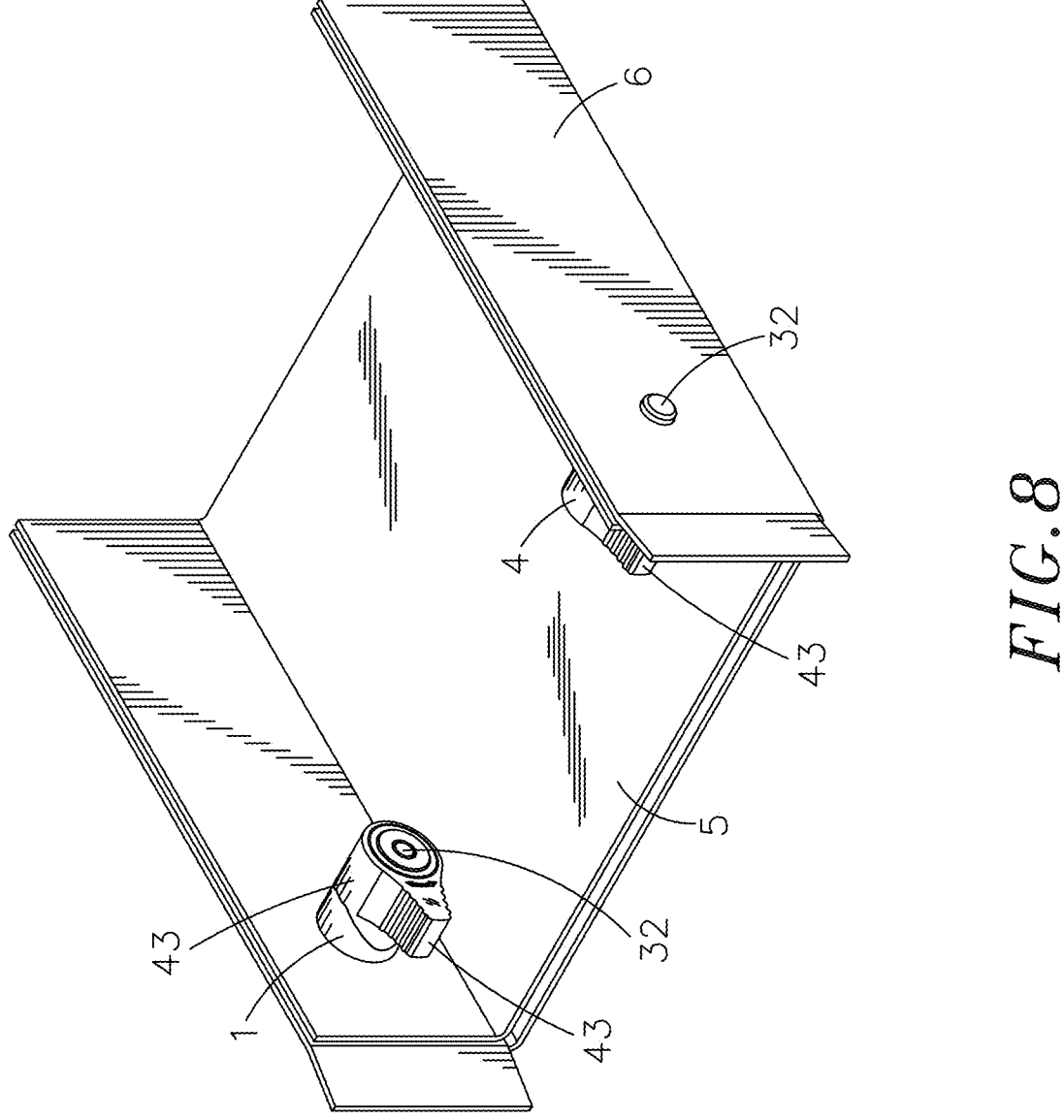
FIG. 8 is an assembled three-dimensional appearance view of the preferred embodiment of the present invention.

Please refer to FIGS. 1 to 8 again. It can be clearly seen from the figures that the fixing device of the present invention can be used in board-to-board devices that need to be disassembled and assembled (for example, telecommunications office cabinets and industrial computers, workstation panel, server chassis and other equipment chassis panel), and use the docking portion 222 outside the flange 22 of the sleeve 2 to assemble it at the docking hole 50 of the preset first plate member 5, and then use the docking portion 222 and the docking hole 50 to align with the retaining hole 60 of the preset second plate member 6. When force is applied to rotate the twisting portion 43 of the wrench 4, the two pushing surfaces 421 and the two receiving portions 422 of the driving path 42 of the wrench 4 can be operated to rotate and slide along the sliding path 24 of the sleeve 2 respectively, so that the two pushing surfaces 421 leave the two positioning portions 122 and move to the two supporting surfaces 121, and the two receiving portions 422 leave the two supporting surfaces 121 and move to a place above the two positioning portions 122. At the same time, the wrench 4 also drives the stop rib 401 on the wall of the internal receiving space 40 to slide along the sliding path 24 of the limiting ring portion 23 from the low part 2401 into the clamping groove 240 and is stopped by the high part 2402 on the other side, so that forming stable clamping positioning. It can also prevent the stop rib 401 from crossing the clamping groove 240, and also effectively avoid excessive friction and loss between the stop rib 401 and the clamping groove 240 and the sliding path 24. Furthermore, the wrench 4 also drives the shaft 3 connected to the locating block 41, so that the shaft 3 is lifted and displaced toward the inside of the accommodation space 20 of sleeve 2, so that the clamping rod 31 on one side of the shaft 3 is not embedded in the retaining hole 60 of the preset second plate member 6 (please also refer to FIGS. 4, 5, and 6), and the preset first plate member 5 and the preset second plate member 6 can then be separated and disassembled.

If force is applied to reversely rotate the twisting portion 43 of the wrench 4, the two pushing surfaces 421 and the two receiving portions 422 of the driving path 42 of the wrench 4 can be reversely operated and then rotated and slid along the sliding path 24 of the sleeve 2 respectively, so that the two pushing surfaces 421 leave the two supporting surfaces 121 and are displaced to embed into the two positioning portions 122, and the two receiving portions 422 leave the two positioning portions 122 and are displaced to embed into the two supporting surfaces 121. At the same time, the wrench 4 also drives the stop rib 401 on the wall of the internal receiving space 40 to slide along the sliding path 24 of the limiting ring portion 23, exit from the clamping groove 240 along the low part 2401, and slide along the sliding path 24. The wrench 4 also drives the shaft 3 connected at the locating block 41, causing the shaft 3 to protrude and displace toward the outside of accommodation space 20 of the sleeve 2, so that the clamping rod 31 on one side of the shaft 3 is aligned and embedded into the retaining hole 60 of the preset second plate member 6 (please also refer to FIGS. 1, 7, and 8), and the preset first plate member 5 can be assembled on the preset second plate member 6.

The above descriptions are only preferred embodiments of the present invention, and do not limit the patent scope of the present invention. Therefore, all simple modifications and equivalent structural changes made by using the contents of the description and drawings of the present invention shall be included in the patent scope of the present invention and shall be clearly stated.

To sum up, the above-mentioned fixing device of the present invention can indeed achieve its effect and purpose when actually used. Therefore, this invention is truly an invention with excellent practicality. In order to meet the application requirements for an invention patent, I file the application in accordance with the law. I hope that the Review Committee will approve this case as soon as possible to protect the inventor's hard work. If the Review Committee has any doubts, please feel free to send us a letter for instructions. The inventor will try our best to cooperate. We sincerely appreciate it.

What the invention claimed is:

1. A fixing device, comprising: a base, a sleeve, a shaft and a wrench, wherein said base comprises a penetrable through hole inside, a limiting groove with an enlarged aperture provided on one side of said through hole, and a continuous undulating guide path provided on an edge of an opposite side of said base relative to said limiting groove;

said sleeve comprises a sleeve body movably through said through hole of said base, a flange located on one side of said sleeve body and clamped in said limiting groove, a limiting ring portion located on an opposite side of said sleeve body relative to said flange and passed through the outside of said base, a penetrable accommodation space provided inside said sleeve, a through hole with a reduced aperture located at said limiting ring portion on one side of said accommodation space, a sliding path with a tapering outer diameter provided on an outer ring surface of said limiting ring portion, and a clamping groove recessed on one side of said sliding path;

said shaft is movably disposed in said accommodation space of said sleeve, a clamping rod provided on one side of said shaft is capable of retractably moving in and out of said accommodation space, a connecting portion provided on an opposite side thereof goes out of said accommodation space and said through hole, an elastic member is mounted around said shaft with one side thereof resisting said clamping rod;

said wrench is mounted outside said sleeve and against said continuous undulating guide path of said base, said wrench comprising a receiving space inside, two opposing stop ribs provided on the inner wall of said receiving space rotate and slide along said sliding path outside said limiting ring portion of said sleeve to allow entry and exit of said clamping groove, a locating block provided on one side of said receiving space for assembly and positioning of said connecting portion of one side of said shaft, a driving path provided on an outer edge of an opposite side of said receiving space to movably resist said continuous undulating guide path of said base, two pushing surfaces respectively provided on said driving path corresponding to the outside of said stop ribs.

2. The fixing device as claimed in claim 1, wherein said continuous undulating guide path of said base is U-shaped, said continuous undulating guide path of said base comprising a supporting surface located at each of two relatively high points and a positioning portion located at each of two relatively low points; said driving path on the outer edge of said opposite side of said wrench is also U-shaped and continuously undulating, said driving path comprising two pushing surfaces diametrically opposed to one another and two receiving portions respectively aligned and fitted to said two positioning portions and said two supporting surfaces, so that said two pushing surfaces and said two receiving portions are capable of rotational displacement along said two supporting surfaces and said two positioning portions of said continuous undulating guide path of said base respectively.

3. The fixing device as claimed in claim 1, wherein said base further comprises a straight blocking edge provided on one side of said limiting groove on one side of said through hole; said sleeve further comprises a resisting cutting edge located on one side of said flange and aligned and abutted against said straight blocking edge.

4. The fixing device as claimed in claim 1, wherein said sleeve is provided with said flange with an enlarged outer diameter on one side of said sleeve body, and said limiting ring portion with an outer diameter smaller than the outer diameter of said flange on an opposite side of said sleeve body; said clamping groove is a straight groove located in the side of said limiting ring portion; the outer diameter of said limiting ring portion at said low part of said clamping groove extends in a gradual increasing ring shape to an outer edge of said high part on an opposite side of said clamping groove to form said sliding path, so that said stop ribs of said wrench are capable of sliding into said clamping groove along said low part of the outer diameter of said limiting ring portion, and then being blocked and limited by said high part on the opposite side of said clamping groove.

5. The fixing device as claimed in claim 1, wherein said clamping rod has a diameter larger than said shaft and further comprises a shoulder formed between said shaft and said clamping rod for one side of said elastic member to resist said shoulder, and said connecting portion on an opposite side of said shaft is assembled to said locating block of one side of said receiving space of said wrench selectively by means of tight fit, interference fit, adhesive bonding or welding; said locating block is provided with a 5 fixing hole for alignment and assembly of said connecting portion.

6. The fixing device as claimed in claim 1, wherein said stop ribs protrude from an inside surface defining said receiving space are arc-shaped in cross-section, said stop 10 ribs correspond to said pushing surfaces on one side of said driving path; said wrench further comprises a trapezoid-shaped twisting portion protruding from the outside thereof relative to said stop ribs and said pushing surfaces.

7. The fixing device as claimed in claim 1, wherein said 15 wrench further comprises a mounting hole on one side of said receiving space for assembly and positioning of said locating block.

\* \* \* \* \*